US012006253B2

(12) United States Patent
Bookbinder et al.

(10) Patent No.: US 12,006,253 B2
(45) Date of Patent: Jun. 11, 2024

(54) METHODS AND APPARATUSES FOR UV CURING OF OPTICAL FIBER COATINGS

(71) Applicant: CORNING INCORPORATED, Corning, NY (US)

(72) Inventors: Dana Craig Bookbinder, Corning, NY (US); Stephan Lvovich Logunov, Corning, NY (US); Darren Andrew Stainer, Wrightsville, NC (US); Pushkar Tandon, Painted Post, NY (US); Ruchi Tandon, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 793 days.

(21) Appl. No.: 17/030,605

(22) Filed: Sep. 24, 2020

(65) Prior Publication Data

US 2021/0094873 A1    Apr. 1, 2021

Related U.S. Application Data

(60) Provisional application No. 62/906,817, filed on Sep. 27, 2019.

(51) Int. Cl.
| | | |
|---|---|---|
| *G02B 6/00* | (2006.01) | |
| *C03C 25/104* | (2018.01) | |
| *C03C 25/12* | (2006.01) | |
| *C03C 25/6226* | (2018.01) | |
| *G02B 6/02* | (2006.01) | |

(52) U.S. Cl.
CPC ............ *C03C 25/104* (2013.01); *C03C 25/12* (2013.01); *C03C 25/6226* (2013.01); *G02B 6/02395* (2013.01); *C03C 2217/73* (2013.01)

(58) Field of Classification Search
CPC ... C03C 25/104; C03C 25/12; C03C 25/6226; C03C 2217/73; G02B 6/02395; G02B 6/00
See application file for complete search history.

(56) References Cited

U.S. PATENT DOCUMENTS

| | | |
|---|---|---|
| 7,399,982 B2 | 7/2008 | Siegel |
| 2004/0067037 A1* | 4/2004 | Tausch ................... C03C 25/12 |
| | | 427/163.2 |

(Continued)

FOREIGN PATENT DOCUMENTS

EP    2388239 A1    11/2011

*Primary Examiner* — Jennifer Doan
(74) *Attorney, Agent, or Firm* — Yiqun Zhao

(57) ABSTRACT

An optical fiber curing component includes a first tube comprising a first body defining a first interior surface and a first exterior surface, the first tube defining a first aperture and a second aperture on opposite ends of a first cavity, wherein the first tube defines a central axis extending through the first cavity; light sources coupled to the first body of the first tube and configured to emit light toward the central axis of the first tube, wherein each of the light sources intersect a common plane defined perpendicular to the central axis of the first tube; a silica glass article, having an anti-reflective coating, disposed between each of the plurality of light sources and the central axis of the first tube; and a reflective coating positioned on the interior surface of the first body and configured to reflect the light toward the central axis of the first tube.

20 Claims, 6 Drawing Sheets

(56) References Cited

U.S. PATENT DOCUMENTS

| | | |
|---|---|---|
| 2005/0222295 A1 | 10/2005 | Siegel |
| 2010/0242299 A1 | 9/2010 | Siegel |
| 2012/0196122 A1* | 8/2012 | Bishop .................. C03C 25/622 |
| | | 427/513 |
| 2017/0318475 A1 | 11/2017 | Kruh et al. |
| 2018/0127593 A1 | 5/2018 | Chen et al. |
| 2019/0008607 A1* | 1/2019 | Bauco ....................... A61L 2/10 |

* cited by examiner

METHODS AND APPARATUSES FOR UV CURING OF OPTICAL FIBER COATINGS

This application claims the benefit of priority to U.S. Provisional Application Ser. No. 62/906,817 filed on Sep. 27, 2019, the content of which is relied upon and incorporated herein by reference in its entirety.

FIELD OF THE DISCLOSURE

Background

Conventional optical fiber technology utilizes the application of ultraviolet curable coatings for bend and damage resistance. The ultraviolet light for curing the coatings is often supplied by mercury discharge lamps which typically emit a broad spectrum of ultraviolet light and have low efficiency.

SUMMARY OF THE DISCLOSURE

According to a first embodiment of the present disclosure, an optical fiber curing component includes: a first tube comprising a first body defining a first interior surface and a first exterior surface, the first tube defining a first aperture and a second aperture on opposite ends of a first cavity, wherein the first tube defines a central axis extending through the first cavity; a plurality of light sources coupled to the first body of the first tube and configured to emit light having a wavelength range from about 250 nm to about 410 nm toward the central axis of the first tube, wherein each of the light sources intersect a common plane defined perpendicular to the central axis of the first tube; a silica glass article having an anti-reflective coating, wherein the silica glass article is disposed between each of the plurality of light sources and the central axis of the first tube; and a reflective coating positioned on the interior surface of the first body and configured to reflect the light toward the central axis of the first tube.

A second embodiment of the present disclosure may include the first embodiment, wherein the silica glass article is one or more windows disposed within the first body of the first tube, a second tube within the cavity, or a combination thereof.

A third embodiment of the present disclosure may include the second embodiment, wherein the first body of the first tube defines the one or more windows, and wherein each of the plurality of light sources is configured to emit light toward the central axis of the first tube through each of a corresponding window.

A fourth embodiment of the present disclosure may include the second embodiment wherein the second tube comprises a second body defining an interior surface and an exterior surface, the second tube defining a first aperture and a second aperture on opposite ends of a second cavity, wherein the central axis extends through the second cavity A fifth embodiment of the present disclosure may include the second embodiment wherein each of the light sources of the plurality of light sources comprises an array of light emitting diodes.

A sixth embodiment of the present disclosure may include the second embodiment wherein the plurality of light sources is equally spaced around the first tube.

A seventh embodiment of the present disclosure may include the first embodiment wherein a distance between at least one of the plurality of light sources and the central axis is from about 1 cm to about 7 cm.

An eighth embodiment of the present disclosure may include the first embodiment wherein each of the plurality of light sources is substantially equally spaced from the central axis of the first tube.

A ninth embodiment of the present disclosure may include the first embodiment further comprising: a second plurality of light sources positioned below the plurality of light sources, wherein the second plurality of light sources are positioned to emit light toward the central axis of the first tube.

A tenth embodiment of the present disclosure may include the ninth embodiment wherein each of the first and second plurality of light sources is configured to produce an intensity of light of from about 10 W/cm2 to about 400 W/cm2 as measured at the central axis of the first tube.

An eleventh embodiment of the present disclosure may include the first embodiment wherein a length of the first tube is from about 100 cm to about 700 cm.

A twelfth embodiment of the present disclosure may include the fourth embodiment wherein a length of the second tube is from about 100 cm to about 700 cm.

A thirteenth embodiment of the present disclosure may include the first embodiment wherein each of the plurality of light sources has a length in a direction parallel to the central axis and the light emitted by each of the plurality of light sources has a wavelength that varies along the length.

According to a fourteenth embodiment of the present disclosure, a method of coating an optical fiber includes: applying a curable composition on a moving optical fiber; passing the optical fiber and the curable composition along a central axis of a substantially circular curing component comprising: a first tube comprising a first body defining a first interior surface and a first exterior surface, the first tube defining a first aperture and a second aperture on opposite ends of a first cavity, wherein the first tube defines a central axis extending through the first cavity, a plurality of light sources coupled to the first body of the first tube and configured to emit light having a wavelength range from about 250 nm to about 410 nm toward the central axis of the first tube, wherein each of the light sources intersect a common plane defined perpendicular to the central axis of the first tube, a silica glass article having an anti-reflective coating, wherein the silica glass article is disposed between each of the plurality of light sources and the central axis of the first tube, and a reflective coating positioned on the interior surface of the first body and configured to reflect the light toward the central axis of the first tube, and; a plurality of light sources positioned around a perimeter of the curing component, wherein each of the light sources intersect a common plane defined perpendicular to the central axis; emitting light from the plurality of light sources toward the central axis of the curing component; reflecting the light off of the reflective coating positioned on the interior surface of the curing component; and curing the curable composition into a coating using the light.

A fifteenth embodiment of the present disclosure may include the fourteenth embodiment wherein the silica glass article is one or more windows disposed within the first body of the first tube, a second tube within the cavity, or a combination thereof.

A sixteenth embodiment of the present disclosure may include the fifteenth embodiment wherein the first body of the first tube defines the one or more windows, and wherein each of the plurality of light sources is configured to emit light toward the central axis of the first tube through each of a corresponding window.

A seventeenth embodiment of the present disclosure may include the fifteenth embodiment wherein the second tube comprises a second body defining an interior surface and an exterior surface, the second tube defining a first aperture and a second aperture on opposite ends of a second cavity, wherein the central axis extends through the second cavity.

According to a eighteenth embodiment of the present disclosure, a method of coating an optical fiber includes: applying a curable composition to a moving optical fiber, wherein the optical fiber is moving at a speed of from about 30 m/s to about 100 m/s; applying a curable ink composition over the curable composition on the optical fiber; passing the optical fiber through a central axis of a curing component comprising a plurality of light sources positioned circumferentially around the component, wherein the curing component comprises: a first tube comprising a first body defining a first interior surface and a first exterior surface, the first tube defining a first aperture and a second aperture on opposite ends of a first cavity, wherein the first tube defines a central axis extending through the first cavity, a plurality of light sources coupled to the first body of the first tube and configured to emit light having a wavelength range from about 250 nm to about 410 nm toward the central axis of the first tube, wherein each of the light sources intersect a common plane defined perpendicular to the central axis of the first tube, a silica glass article having an anti-reflective coating, wherein the silica glass article is disposed between each of the plurality of light sources and the central axis of the first tube, and a reflective coating positioned on the interior surface of the first body and configured to reflect the light toward the central axis of the first tube; emitting ultraviolet light from the plurality of light sources toward the central axis of the first tube, wherein the ultraviolet light has an intensity of from about 48 W/cm2 to about 384 W/cm2 as measured at the central axis; reflecting the ultraviolet light off of the reflective coating positioned on the interior surface of the curing component; and curing the curable ink composition and the curable composition with the ultraviolet light simultaneously.

A nineteenth embodiment of the present disclosure may include the eighteenth embodiment wherein the silica glass article is one or more windows disposed within the first body of the first tube, a second tube within the cavity, or a combination thereof.

A twentieth embodiment of the present disclosure may include the nineteenth embodiment wherein the first body of the first tube defines the one or more windows, and wherein each of the plurality of light sources is configured to emit light toward the central axis of the first tube through each of a corresponding window and wherein the second tube comprises a second body defining an interior surface and an exterior surface, the second tube defining a first aperture and a second aperture on opposite ends of a second cavity, wherein the central axis extends through the second cavity.

According to another feature of the present disclosure, a method of coating an optical fiber includes: applying a curable composition on a moving optical fiber; passing the optical fiber and the curable composition along a central axis of a substantially circular curing component comprising: a first tube comprising a first body defining a first interior surface and a first exterior surface, the first tube defining a first aperture and a second aperture on opposite ends of a first cavity, wherein the first tube defines a central axis extending through the first cavity, a plurality of light sources coupled to the first body of the first tube and configured to emit light having a wavelength range from about 250 nm to about 410 nm toward the central axis of the first tube, wherein each of the light sources intersect a common plane defined perpendicular to the central axis of the first tube, a silica glass article having an anti-reflective coating, wherein the silica glass article is disposed between each of the plurality of light sources and the central axis of the first tube, and a reflective coating positioned on the interior surface of the first body and configured to reflect the light toward the central axis of the first tube; a plurality of light sources positioned around a perimeter of the curing component, wherein each of the light sources intersect a common plane defined perpendicular to the central axis; emitting light from the plurality of light sources toward the central axis of the curing component; reflecting the light off of the reflective coating positioned on the interior surface of the curing component; and curing the curable composition into a coating using the light.

According to another feature of the present disclosure, a method of coating an optical fiber includes: applying a curable composition to a moving optical fiber, wherein the optical fiber is moving at a speed of from about 30 m/s to about 100 m/s; applying a curable ink composition over the curable composition on the optical fiber; passing the optical fiber through a central axis of a curing component comprising a plurality of light sources positioned circumferentially around the component, wherein the curing component comprises: a first tube comprising a first body defining a first interior surface and a first exterior surface, the first tube defining a first aperture and a second aperture on opposite ends of a first cavity, wherein the first tube defines a central axis extending through the first cavity, a plurality of light sources coupled to the first body of the first tube and configured to emit light having a wavelength range from about 250 nm to about 410 nm toward the central axis of the first tube, wherein each of the light sources intersect a common plane defined perpendicular to the central axis of the first tube, a silica glass article having an anti-reflective coating, wherein the silica glass article is disposed between each of the plurality of light sources and the central axis of the first tube, and a reflective coating positioned on the interior surface of the first body and configured to reflect the light toward the central axis of the first tube; emitting ultraviolet light from the plurality of light sources toward the central axis of the tube, wherein the ultraviolet light has an intensity of from about 40 $W/cm^2$ to about 400 $W/cm^2$ as measured at the central axis; reflecting the ultraviolet light off of the reflective coating positioned on the interior surface of the curing component; and curing the curable ink composition and the curable composition with the ultraviolet light simultaneously.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1A:
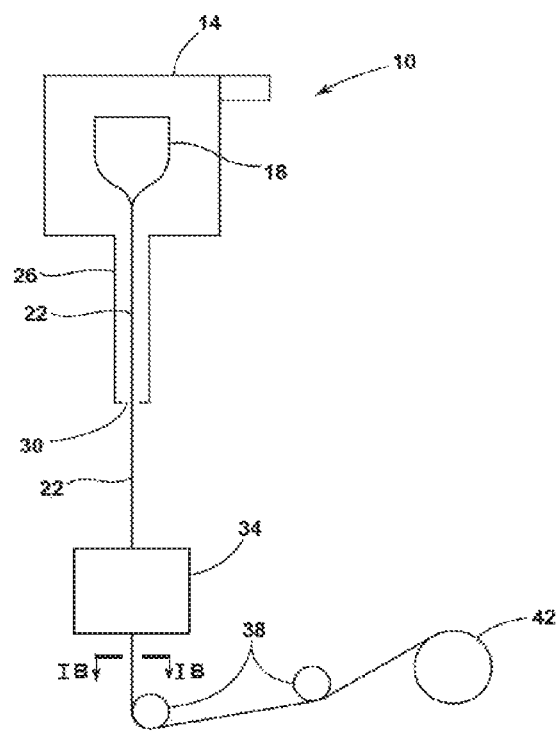
FIG. 1A is a schematic depiction of a fiber draw system, according to at least one example.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be transient, removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 1B:
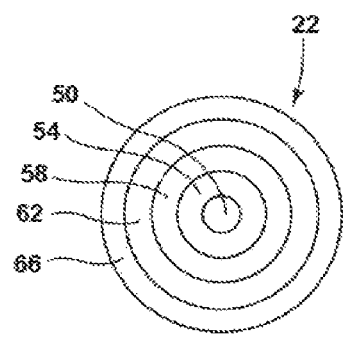
FIG. 1B is a cross-sectional view taken at line IB-IB of FIG. 1A, according to at least one example.

Referring now to FIGS. 1A and 1B, an optical fiber production system 10 is generally shown. The optical fiber production system 10 includes a furnace 14 that may be heated to a temperature of about 2100° C. A glass optical fiber preform 18 is placed in the furnace 14 and an optical fiber 22 is drawn therefrom. The glass optical fiber preform 18 may be constructed of any glass or material and may be doped. Once the optical fiber 22 is drawn from the glass optical fiber preform 18, the optical fiber 22 may be cooled in a slow-cooling treatment device 26. Although referred to herein as a slow-cooling treatment device 26, it will be understood that the slow-cooling treatment device 26 may also be known as a muffle or lower extended muffle. The slow-cooling treatment device 26 is shown integrally coupled to the exit of the furnace 14, but it will be understood that the slow-cooling treatment device 26 could be distanced from the furnace 14 or connected to the furnace 14 in another manner.

The slow-cooling treatment device 26 is configured to cool the optical fiber 22 at a rate that is slower than the cooling rate of the optical fiber 22 in air at 25° C. and a pressure of 1 atm. The slow-cooling treatment device 26 may be connected to the output of furnace 14 such that the optical fiber 22 enters the slow-cooling treatment device 26 at a temperature of from about 1,600° C. to about 2,100° C. and exits the slow-cooling treatment device 26 through an exit orifice 30 at a temperature of about 500° C. or greater. The optical fiber 22 may pass through room temperature air and/or one or more other components (e.g., fiber centering devices, micrometers, diagnostic devices, etc.) for a sufficient distance to cool the optical fiber 22. After sufficient cooling, the optical fiber 22 is then subjected to a coating section 34 of the system 10 where one or more coatings are applied to the optical fiber 22 and cured. As will be explained in greater detail below, the coating section 34 may include a plurality of components to provide the one or more coatings on the optical fiber 22. After leaving the coating section 34, the optical fiber 22 with the coatings can pass through a variety of processing stages within the optical fiber production system 10 such as tractors or rollers 38 and onto a fiber storage spool 42. One of the rollers 38 may be used to provide the necessary tension on the optical fiber 22 as it is drawn through the entire system and eventually wound onto the storage spool 42. The optical fiber 22 may be drawn at a rate of about 40 m/s, or about 50 m/s, or about 60 m/s, or about 70 m/s, or about 80 m/s, or about 90 m/s, or about 100 m/s, or any and all values and ranges therebetween.

The optical fiber 22, including the coatings applied by the coating section 34, is a layered structure. The optical fiber 22 includes a core 50 at its center and a cladding 54 surrounding the core 50. The core 50 and the cladding 54 may be composed of one or more glasses. According to various examples, the core 50 and the cladding 54 have different refractive indices than one another such that the optical fiber 22 is an electromagnetic waveguide. Positioned on an exterior surface of the cladding 54 is a primary coating 58. Positioned on the primary coating 58 is a secondary coating 62. Positioned on the secondary coating 62 may be an optional ink layer 66. The functions of the primary coating 58 and the secondary coating 62 are generally to protect the optical fiber 22 from mechanical damage and to preserve the ability of the optical fiber 22 to transport light. The function of the ink layer 66 is generally to provide a translucent or opaque colored coating to the optical fiber 22, which provides a manner of identifying the fiber 22 (e.g., in ribbon cable examples).

The primary coating 58 is applied directly to the exterior surface of the cladding 54. The primary coating 58 may be a soft (e.g., low modulus) coating which dissipates forces that reach the interior of the coated fiber 22 and prevents the forces from being transferred to the core 50 and/or cladding 54. The primary coating 58 may be advantageous in dissipating stresses that arise when the optical fiber 22 experiences small deformations in the optical fiber cable when deployed in the field. The primary coating 58 may have a thickness (i.e., in the cured and/or uncured state) of about 20 nm, about 30 nm, or about 40 nm, or about 44 nm, or about 48 nm, or about 52 nm, or about 56 nm, or about 60 nm, or about 64 nm, or about 65 nm, or about 66 nm, or about 68 nm, or about 72 nm, or about 76 nm, or about 80 µm or any and all values and ranges between these values.

The primary coating 58 may be the cured product of a primary curable composition (e.g., a first curable composition) which is applied to the cladding 54 of the optical fiber 22. The primary curable composition may include an oligomer and at least one monomer. The primary curable composition used in forming the primary coating 58 may also include photoinitiators, antioxidants, and/or other additives. According to various examples, the oligomer and monomer(s) of the primary curable composition are (meth) acrylate-based, where the term "(meth)acrylate" means acrylate, methacrylate, or combinations thereof. The oligomer may be, for example, a urethane (meth)acrylate oligomer, but it will be understood that other oligomers such as epoxy, vinyl ether, and thiolene, may be used without departing from the teachings provided herein. One group of suitable monomers for use in the monomer component includes alkoxylated (meth)acrylates, ethoxylated (meth) acrylates, ethoxylated alkylphenol mono(meth)acrylates, propylene oxide (meth)acrylates, n-propylene oxide (meth) acrylates, iso-propylene oxide (meth)acrylates, monofunctional (meth)acrylates, multifunctional (meth)acrylates, and combinations thereof.

The total oligomer content of the primary curable composition may be between about 5 wt % and about 95 wt %, or from about 25 wt % and about 75 wt %, or from about 40 wt % and about 60 wt %. As used herein, the weight percent of a particular component refers to the amount introduced into the bulk composition excluding an adhesion promoter and other additives. The monomer component of the primary curable composition is generally selected to be compatible with the oligomer, to provide a low viscosity formulation, to increase the refractive index of the primary coating 58, and/or to confer a desirable degree of hydrophilicity on the cured polymeric material of the primary coating 58. The monomeric component may be present in the primary curable composition in an amount of from about 5 wt % to about 95 wt %, or from about 5 wt % to about 60 wt %, or from about 20 wt % to about 50 wt %.

The secondary coating 62 may be the cured product of a secondary curable composition (e.g., a second curable composition) which has been polymerized (i.e., cured). The secondary curable composition may contain urethane acrylate compounds whose molecules become cross-linked when polymerized. The secondary coating 62 is applied over the primary coating 58 and is typically a high modulus material that functions as a tough layer to protect the optical fiber 22 from environmental exposure and mechanical damage. The secondary coating 62 may have a thickness (i.e., in the cured and/or uncured state) of about 10 µm, or about 12 µm, or about 14 µm, or about 16 µm, or about 18 µm, or about 20 µm, or about 22 µm, or about 24 µm, or about 26 µm, or about 28 µm, or about 30 µm, or about 32 µm, or about 34 µm or any and all values and ranges between these values.

Although depicted as a distinct layer positioned on the secondary coating 62 in FIG. 1B, the ink layer 66 may be positioned directly on the primary coating 58. The ink layer 66 is the cured product of a curable ink composition (e.g. a third curable composition). The curable ink composition may include one or more curable monomers, one or more curable oligomers, one or more pigments, one or more optical brighteners and/or other constituents, such as the additives noted above. The one or more pigments may be present in the curable ink composition in an amount in the range from about 0.5 wt % to about 20 wt %, or in the range from about 1 wt % to about 15 wt %, or in the range from about 2 wt % to about 10 wt %. The one or more optical brighteners may be present in the curable ink composition in an amount in the range from about 0.5 wt % to about 20 wt %, or in the range from about 1 wt % to about 15 wt %, or in the range from about 2 wt % to about 10 wt %. The curable ink composition may also include up to 25 wt % of dispersant to promote a more uniform, less aggregated distribution of the pigment. The ink layer 66 may have a thickness (i.e., in the cured and/or uncured state) of about 0.5

μm, or about 1.0 μm, or about 1.5 μm, or about 2.0 μm, or about 2.5 μm, or about 3.0 μm, or about 3.5 μm, or about 4.0 μm, or about 4.5 μm, or about 5.0 μm, or about 5.5 μm, or about 6.0 μm, or about 6.5 μm, or about 7.0 μm, or about 7.5 μm or about 8.0 μm or any and all values and ranges between these values.

The primary curable composition, the secondary curable composition and/or the curable ink composition may also include a photoinitiator. The photoinitiator may initiate curing of the different compositions upon exposure to ultraviolet radiation. Suitable photoinitiators for the curable compositions include 1-hydroxycyclohexylphenyl ketone, bis(2,6-dimethoxybenzoyl)-2,4,4-trimethylpentylphosphine oxide, 2,2-dimethoxy-2-phenylacetophenone, bis(2,4,6-trimethylbenzoyl)-phenylphosphine oxide, (2,4,6-trimethylbenzoyl)diphenyl phosphine oxide, ethoxy(2,4,6-trimethylbenzoyl)-phenylphosphine oxide, other photoinitiators and/or combinations thereof. The photoinitiator may be present in the primary curable composition, the secondary curable composition and/or the curable ink composition in an amount from about 0.50 wt % to about 5.0 wt %, or from about 1.0 wt % to about 3.0 wt %. In other terms, the primary curable composition, the secondary curable composition and/or the curable ink composition may include the photoinitiator at a concentration of from about 0.010 mol/L to about 0.060 mol/L, or from about 0.010 mol/L to about 0.050 mol/L, 0.010 mol/L to about 0.043 mol/L, or from about 0.010 mol/L to about 0.035 mol/L.

Figure 2A:
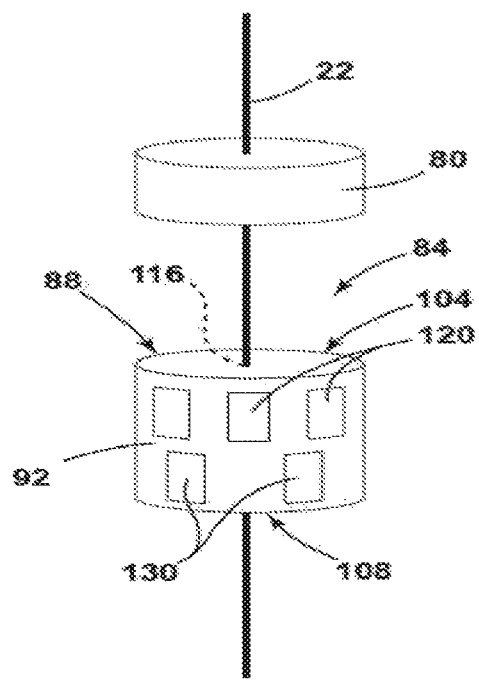
FIG. 2A is a perspective view of a coating section of the fiber draw system, according to at least one example.
Figure 2B:
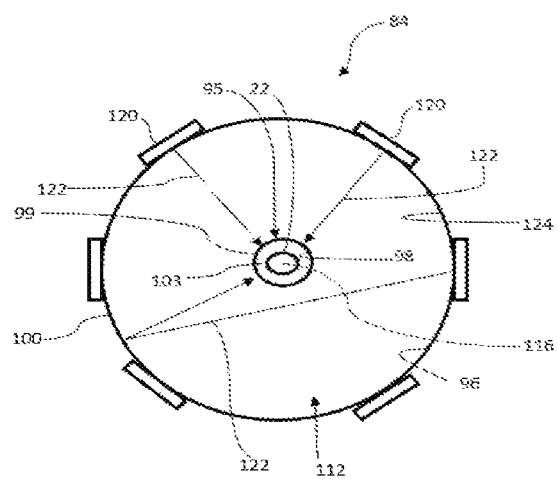
FIG. 2B is a top view of an optical fiber curing component, according to at least one example.
Figure 2C:
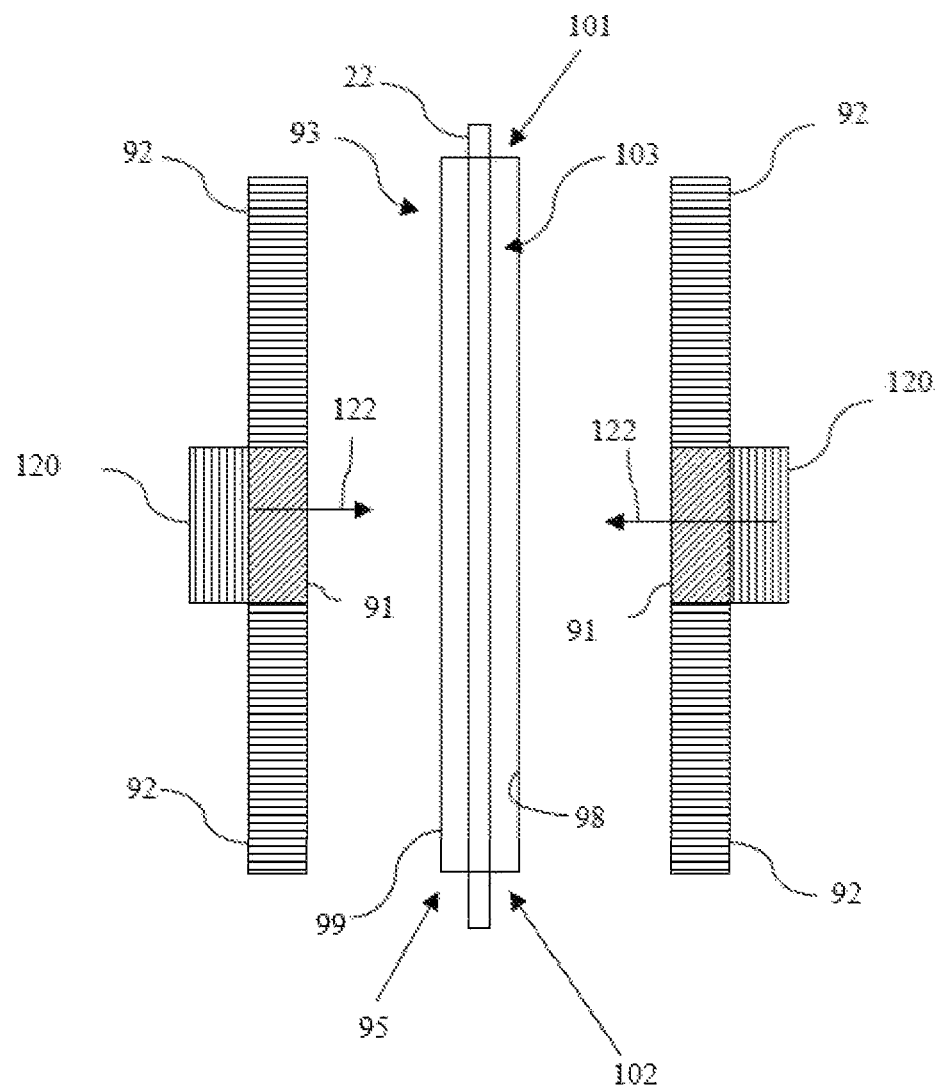
FIG. 2C is a section view of an optical fiber curing component, according to at least one example.

Referring now to FIGS. 2A and 2B and 2C, the coating section 34 of the optical fiber production system 10 may include one or more coating units 80 and one or more optical fiber curing components 84 through which the optical fiber 22 passes. The coating units 80 are configured to apply one or more of the primary curable composition, the secondary curable composition and/or the curable ink composition to the optical fiber 22. The coating unit(s) 80 operate by passing the optical fiber 22 through a coating die that confines a coating liquid (e.g., the primary curable composition, the secondary curable composition and/or the curable ink composition) around the optical fiber 22 such that the coating liquid is applied to the most exterior surface available of the optical fiber 22. The coating unit(s) 80 may operate in a "wet-on-dry" mode and/or in a "wet-on-wet" mode. In the wet-on-dry mode, the coating unit 80 applies one of the primary curable composition, the secondary curable composition and/or the curable ink composition to a dry or already cured surface. For example, a first coating unit 80 may apply the primary curable composition to the exterior surface of the cladding 54 of the optical fiber 22 and then cure the primary curable composition to form the primary coating 58 on the optical fiber 22 using the curing component 84. The process would then be repeated for the subsequent layers (e.g. the secondary coating 62 and/or the ink layer 66) by passing the optical fiber 22 through a second coating unit 80 and a second curing component 84. In the wet-on-wet mode of operation, the coating unit 80 may be configured to apply multiple successive curable compositions to the optical fiber 22 prior to any curing by the curing component 84. For example, the coating unit 80 may apply the secondary curable composition onto the primary curable composition before curing the primary curable composition, or the curable ink composition onto the secondary curable composition before curing the primary curable composition and/or the secondary curable composition. Following the wet-on-wet application, the optical fiber 22 may be passed through the curing component 84 which may simultaneously cure the compositions on the optical fiber 22. Such a feature may be advantageous in decreasing the number of coating units 80 and curing components 84 utilized in the optical fiber production system 10. It will be understood that regardless of the mode of operation, the coating unit 80 may apply less than a full thickness of any one of the primary curable composition, secondary curable composition and/or curable ink composition such that the optical fiber 22 may be passed through more than one coating unit 80 and/or curing component 84 to produce the primary coating 58, the secondary coating 62 and/or the ink layer 66.

The curing component 84 is positioned downstream of the coating unit 80. In other words, the optical fiber 22 exits the coating unit 80 and subsequently passes into the curing component 84. The curing component 84 may be connected to the coating unit 80 or may be positioned at some distance therefrom. The curing component 84 is configured to provide one or more forms of energy to cure (polymerize) the primary curable composition, the secondary curable composition and/or the curable ink composition on the optical fiber 22. The curing component 84 includes a first tube 88 with a body 92 defining an interior surface 96 and an exterior surface 100. The first tube 88 defines a first aperture 104 and a second aperture 108 on opposite ends of a cavity 112. The first tube 88 defines a central axis 116 extending through the cavity 112. The optical fiber 22 generally follows the central axis 116 of the first tube 88 while the optical fiber 22 passes through the curing component 84. The curing component 84 further includes a plurality of light sources 120 coupled to the body 92 of the first tube 88 and configured to emit light 122 toward the central axis 116 of the first tube 88. A reflective coating 124 is positioned on the interior surface 96 of the body 92 and configured to reflect the light 122. According to various examples, the curing component 84 may include a second plurality of light sources 130 positioned downstream (i.e. in the direction in which optical fiber 22 is drawn) or below the plurality of light sources 120. The second plurality of light sources 130 is positioned to emit the light 122 toward the central axis 116 of the first tube 88 in a substantially similar manner to the plurality of light sources 120. The curing component 84 includes a silica glass article having an anti-reflective coating. The silica glass article is disposed between each of the plurality of light sources and the centrals axis of the first tube. In some embodiments, the silica glass article is: a second tube 95 within the cavity 112, one or more windows 91 through which light 122 from the plurality of light sources is emitted toward the central axis 116 of the first tube 88, or a combination thereof. The second tube 95 comprises a second body 97 defining a first interior surface 98 and a second exterior surface 99. The second tube 95 defines a first aperture 101 and a second aperture 102 on opposite ends of a second cavity 103. The central axis 116 extends through the second cavity 103. The optical fiber 22 generally follows the central axis 116 while the optical fiber 22 passes through the curing component 84. The first interior surface 98 of the body 97 of the second tube 95 may have a cross-sectional shape which is substantially circular, oblong, oval, triangular, square, rectangular, pentagonal or other higher order polygons. The second exterior surface 99 of the body 97 of the second tube 95 may have a cross-sectional shape which is substantially circular, oblong, oval, triangular, square, rectangular, pentagonal or other higher order polygons. According to various examples, the first interior surface 98 of the second tube 95 may have a different cross-sectional shape than the second exterior surface 99. For example, in some embodiments the first interior surface 98 may have an oval cross-sectional shape and the second exterior surface 99 may have a circular cross-sectional shape. The second tube 95 may have a length (i.e., as measured from the first aperture 101 to the second aperture 102) of about 50 cm, or about 100 cm, or about 150 cm, or about 200 cm, or about 250 cm, or about 300 cm, or about 350 cm, or about 400 cm, or about 450 cm, or about 500 cm, or about 550 cm, or about 600 cm, or about 650 cm, or about 700 cm, or about 750 cm, or about 800 cm, or about 850 cm, or about 900 cm, or about 950 cm, or about 1000 cm, or any and all values and ranges between these values. For example, the second tube 95 may have a length of from about 50 cm to about 1000 cm or from about 100 cm to about 800, or from about 100 cm to about 700 cm, or from about 100 cm to about 600 cm, or from about 100 cm to about 500 cm, or from about 100 cm to about 400 cm. In some embodiments, the second tube 95 has a length that is equal to the length of the first tube 88. In some embodiments, the second tube 95 controls the atmosphere around the optical fiber 22 and prevents coating volatiles from contaminating (e.g. depositing onto) the interior surfaces of the first tube 88. The anti-reflective coating 93 on the second tube 95 may be on a first side (i.e. on the side facing the light source 120), on a second side (i.e. on the side facing the second cavity 103), or on both the first side and the second side. In some embodiments, the anti-reflective coating 93 is a very low index material (e.g. a coating having a refractive index of less than 1.4), or a low index material (e.g. a coating having a refractive index in a range from $1.4 \leq n < 1.6$), or a medium index material (e.g. a coating having a refractive index in a range from $1.6 \leq n < 1.8$), or a medium high index material (e.g. a coating having a refractive index in a range from $1.8 \leq n < 2.2$), or a high index material (e.g. a coating having a refractive index of $n \geq 2.2$). In some embodiments, the anti-reflective coating 93 may be a multi-layer coating, for example alternating layers of high and low index materials. In some embodiments, the anti-reflective coating is nano-porous silica, $MgF_2$, $SiO_2$, $CaF_2$, $BaF_2$, $Al_2O_3$, $CeF_3$, $HfO_2$, $Ta_2O_5$, $TiO_2:Pr_2O_3$, $Nb_2O_5$, $TiO_2$, $ZrO_2$, $Y_2O_3$, or $Nb_2O_5:TiO_2$.

The interior surface 96 and/or the exterior surface 100 of the body 92 of the first tube 88 may have a cross-sectional shape which is substantially circular, oblong, oval, triangular, square, rectangular, pentagonal or other higher order polygons. According to various examples, the interior surface 96 of the first tube 88 may have a different cross-sectional shape than the exterior surface 100. The first tube 88 may have a length (i.e., as measured from the first aperture 104 to the second aperture 108) of about 50 cm, or about 100 cm, or about 150 cm, or about 200 cm, or about 250 cm, or about 300 cm, or about 350 cm, or about 400 cm, or about 450 cm, or about 500 cm, or about 550 cm, or about 600 cm, or about 650 cm, or about 700 cm, or about 750 cm, or about 800 cm, or about 850 cm, or about 900 cm, or about 950 cm, or about 1000 cm, or any and all values and ranges between these values. For example, the first tube 88 may have a length of from about 50 cm to about 1000 cm or from about 100 cm to about 800, or from about 100 cm to about 700 cm, or from about 100 cm to about 600 cm, or from about 100 cm to about 500 cm, or from about 100 cm to about 400 cm.

As explained above, the interior surface 96 of the body 92 of the first tube 88 may include one or more reflective coatings 124. The reflective coating 124 may include a metalized foil or other reflective material applied to the interior surface 96 of the body 92. The reflective coating 124 may be a continuous structure or may be discontinuous around the interior surface 96. The reflective coating 124 may have a smooth or textured surface. The reflective coating 124 may be configured to reflect one or more wavelengths or wavelength bands of the electromagnetic spectrum of light. For example, the reflective coating 124 may be configured to reflect ultraviolet light and/or short wave visible light. The reflective coating 124 may reflect one or more wavelengths or wavelength bands of light having a wavelength of from about 10 nm to about 410 nm. As will be explained in greater detail below, the reflective coating 124 is configured to reflect the light 122 emitted from the plurality of light sources 120 and/or the second plurality of light sources 130 within the first tube 88 such that the light 122 ultimately interacts with the optical fiber 22 (or curable composition thereon) passing through the central axis 116 of the first tube 88. In other words, light 122 which may miss the optical fiber 22 on its first pass may be reflected by the reflective coatings 124 and redirected back toward the central axis 116 to interact with the optical fiber 22 (or curable composition thereon).

The plurality of light sources 120 are coupled to the body 92 of the first tube 88 and configured to emit the light 122 toward the central axis 116 of the first tube 88. It will be understood that the plurality of light sources 120 of the curing component 84 may be integrated into a single unitary element extending partially or fully around a perimeter of the first tube 88 without departing from the teachings provided herein. The plurality of light sources 120 may be coupled on the interior surface 96 of the first tube 88, integrated into the first tube 88 and/or coupled to the exterior surface 100 of the first tube 88. The body 92 of the first tube 88 may define one or more windows 91 (or apertures) at which the plurality of light sources 120 is positioned. The one or more windows 91 may be a silica glass through which light 122 from the plurality of light sources is emitted toward the central axis 116 of the first tube 88. The one or more windows may have an anti-reflective coating 93. The anti-reflective coating 93 may be on a first side (i.e. on the side facing the light source 120), on a second side (i.e. on the side facing the cavity 112), or on both the first side and the second side. In some embodiments, the anti-reflective coating 93 is a very low index material (e.g. a coating having a refractive index of less than 1.4), or a low index material (e.g. a coating having a refractive index in a range from $1.4 \leq n < 1.6$), or a medium index material (e.g. a coating having a refractive index in a range from $1.6 \leq n < 1.8$), or a medium high index material (e.g. a coating having a refractive index in a range from $1.8 \leq n < 2.2$), or a high index material (e.g. a coating having a refractive index of $n \geq 2.2$). In some embodiments, the anti-reflective coating 93 may be a multi-layer coating, for example alternating layers of high and low index materials. In some embodiments, the anti-reflective coating is nano-porous silica, $MgF_2$, $SiO_2$, $CaF_2$, $BaF_2$, $Al_2O_3$, or $CeF_3$, The curing component 84 may include two or more, three or more, four or more, five or more, six or more, seven or more, eight or more, nine or more or ten or more light sources in the plurality of light sources 120 positioned around the body 92 of the first tube 88. The plurality of light sources 120 may have an equal spacing from one another or the spacing between the plurality of light sources 120 may vary around the first tube 88. For example, two or more of the plurality of light sources 120 may be angularly separated by about 10° or greater, or about 20° or greater, or about 30° or greater, or about 40° or greater, or about 50° or greater, or about 60° or greater, or about 70° or greater, or about 80° or greater, or about 90° or greater, or about 100° or greater, or about 110° or greater, or about 120° or greater, or about 130° or greater, or about 140° or greater, or about 150° or greater, or about 160° or greater, or about 170° or greater, or about 180° or any and all values and ranges therebetween. According to various examples, at least two of the plurality of light sources 120 are angularly offset from one another by about 60° or less. For purposes of this disclosure, the term: "angularly offset" refers to the angle between the center of two adjacent light sources 120 as measured from the central axis 116 of the first tube 88 in a plane perpendicular to the central axis 116.

Each of the plurality of light sources 120 may have a substantially equal distance from the central axis 116, or the distance may be different. The distance between one or more of the plurality of light sources 120 and the central axis 116 may be about 0.5 cm, or about 1 cm, or about 2 cm, or about 3 cm, or about 4 cm, or about 5 cm, or about 6 cm, or about 7 cm, or about 8 cm, or about 9 cm, or about 10 cm, or about 15 cm, or about 20 cm, or about 25 cm, or about 30 cm or any and all values and ranges between these values. For example, the distance between at least one of the plurality of light sources 120 and the central axis 116 of the first tube 88 may be from about 1 cm to about 30 cm, or from about 1 cm to about 7 cm. As explained above, each of the plurality of light sources 120 may be substantially equally spaced from the central axis 116 of the first tube 88.

One or more of the plurality of light sources 120 may have a length (i.e., measured in a direction parallel with the central axis 116) of about 0.1 m, or about 0.2 m, or about 0.3 m, or about 0.4 m, or about 0.5 m, or about 0.6 m, or about 0.7 m, or about 0.8 m, or about 0.9 m, or about 1.0 m, or about 1.1 m, or about 1.2 m, or about 1.3 m, or about 1.4 m, or about 1.5 m, or about 1.6 m, or about 1.7 m, or about 1.8 m, or about 1.9 m, or about 2.0 m or any and all values and ranges between these values. For example, the length of one or more of the light sources 120 may be from about 0.2 m to about 2 m.

According to various examples, the plurality of light sources 120 is positioned on the first tube 88 such that two or more of the plurality of light sources 120 intersect a common plane which is perpendicular to the central axis 116. For example, each of the light sources 120 may be positioned such that a center or central region of each light source 120 intersects the common plane. In such an example, the centers of each of the light sources 120 may be aligned with each other along the common plane. In other words, a central region of one or more of the light sources 120 intersects the common plane. In other examples, one or more of the light sources 120 may intersect the common plane at a different location than one or more of the other light sources 120. For example, a top or upper region of one or more of the light sources 120 may intersect the common plane while one or more other light sources 120 may intersect the common plane at a different location (e.g., the center, lower and/or bottom of the light source 120). It will be understood that one or more of the plurality of light sources 120 may not intersect the common plane without departing from the teachings provided herein. Aligning two or more of the light sources 120 such that they intersect with the common plane may be advantageous in overlapping the light 122 such that a greater intensity of the light 122 at the central axis 116 may be achieved.

Each of the plurality of light sources 120 may be composed of an array of light-emitting diodes arranged to emit the light 122 toward the central axis 116 of the first tube 88. According to various examples, the light-emitting-diodes may be configured to emit ultraviolet light and/or short-wave visible light. The light-emitting diodes may emit a relatively monochromatic band of ultraviolet and/or short-wave visible light that is centered at a specified peak wavelength; whereas conventional ultraviolet light sources (e.g., arc, mercury vapor, and microwave systems) tend to be broadband emitters with a range of output between 200 and 445 nm. Exemplary wavelength peaks for the plurality of light sources 120 may be 365 nm, 385 nm, 395 nm and/or 405 nm. According to various examples, the ultraviolet light and/or short-wave visible light emitted from one or more of the plurality of light sources 120 may have a wavelength peak within a wavelength range of from about 250 nm to 410 nm, or from about 270 nm to about 400 nm, or from about 290 nm to about 400 nm, or from about 310 nm to about 400 nm, or from about 330 nm to about 400 nm. It will be understood that each of the plurality of light sources 120 may emit the same or different wavelengths of light than one another without departing from the teachings provided herein. Further, as the plurality of light sources 120 are composed of an array of light-emitting diodes, the wavelength and/or intensity of the light 122 emitted may vary across the length of the light source 120. Such a feature may be advantageous in preferentially curing one or more of the primary curable composition, the secondary curable composition and/or the curable ink composition. For example, an upper portion (i.e. portion nearest aperture 104) of the plurality of light sources 120 may be configured to emit a higher intensity light 122 which is configured to cure the primary curable composition while lower portions (i.e. portions nearest aperture 108) of the plurality of light sources 120 (e.g., or the second plurality of light sources 130) may be configured to emit the light 122 at a different intensity and different wavelength for curing the curable ink composition. Such a feature may be advantageous in selectively curing the primary curable composition, the secondary curable composition and/or the curable ink composition while the coating unit 80 is operating in the wet-on-wet mode. In the wet-on-wet mode, two or more curable compositions are applied sequentially and subsequently cured in an optical fiber curing component 84 comprising a plurality of light sources.

As explained above, the plurality of light sources 120 is configured to emit the light 122 toward the central axis 116 of the first tube 88 where the optical fiber 22 passes through the curing component 84. The combined output of the plurality of light sources 120 toward the central axis 116, combined with the light 122 which is reflected back toward the central axis 116 by the reflective coating 124, is configured to produce a high intensity of light 122 at the central axis 116 and on the optical fiber 22 (or curable composition thereon). The intensity of the light 122, as measured at a surface of the optical fiber 22 (or surface of a curable composition thereon), may be about 40 W/cm², or about 48 W/cm², or about 50 W/cm², or about 60 W/cm², or about 80 W/cm², or about 100 W/cm², or about 120 W/cm², or about 140 W/cm², or about 160 W/cm², or about 180 W/cm², or about 200 W/cm², or about 220 W/cm², or about 240 W/cm², or about 260 W/cm², or about 280 W/cm², or about 300 W/cm², or about 320 W/cm², or about 340 W/cm², or about 360 W/cm², or about 380 W/cm², or about 400 W/cm² or any and all values and ranges between these values. For example, the intensity of the light 122 at the surface of the optical fiber 22 (or surface of a curable composition thereon) may be from about 10 W/cm² to about 400 W/cm², or from about 48 W/cm² to about 400 W/cm², or from about 48 W/cm² to about 348 W/cm², or from about 100 W/cm² to about 348 W/cm². The light 122 emitted from the plurality of light sources 120 may be generally directed toward the central axis 116 via positioning of the plurality of light sources 120, one or more lenses, one or more collimators and/or other methods and structures for directing the light 122. The light 122 from the plurality of light sources 120 may be focused or otherwise condensed such that the size of a spot of the directed light 122 is relatively small. For example, the spot size of the light 122 may have a largest dimension of about 1 cm, or about 2 cm, or about 3 cm, or about 4 cm, or about 5 cm, or about 6 cm, or about 7 cm, or about 8 cm, or about 9 cm, or about 10 cm or any and all values and ranges between these values. For example, the spot size may be from about 1 cm to about 10 cm, or from about 1 cm to about 8 cm, or from about 2 cm to about 8 cm. According to various examples, the spot may extend the length of the central axis 116 within the curing component 84. Use of the plurality of light sources 120 which emit the light 122 toward the central axis 116 may be advantageous in increasing the number of photons per unit length which may result in a faster curing of the primary curable composition, the secondary curable composition and/or the curable ink composition such that a shorter length of the optical fiber production system 10 and/or higher draw speed of the optical fiber 22 may be achieved.

It will be understood that the foregoing discussion of the structure, construction, orientation and operation of the plurality of light sources 120 equally applies to the second plurality of light sources 130. The second plurality of light sources 130 may be vertically aligned with the plurality of light sources 120 or may be offset. Further, there may be more, less or the same number of second plurality of light sources 130 as the plurality of light sources 120. In addition, optical fiber production system 10 may include a third, fourth, etc. plurality of light sources.

Figure 3:
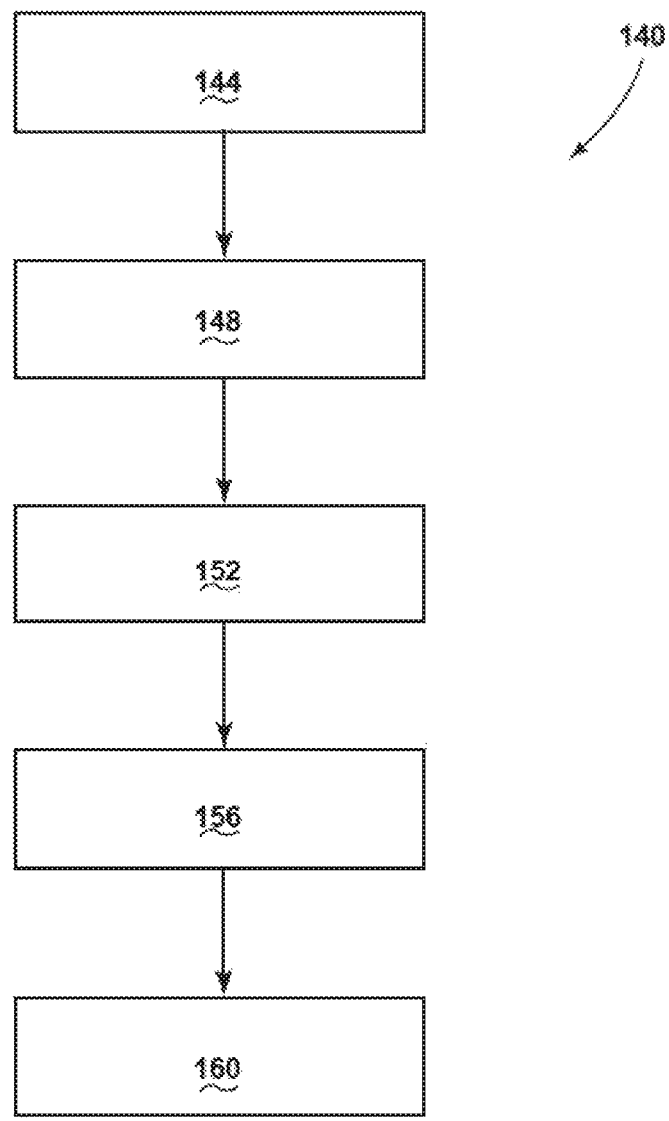
FIG. 3 is a flowchart of a method, according to at least one example.

Referring now to FIG. 3, depicted is a method 140 of coating the optical fiber 22. The method 140 may begin with a step 144 of applying a curable composition (e.g., at least one of the primary curable composition, the secondary curable composition and/or the ink curable composition) on an optical fiber 22 as it is being drawn through optical fiber production system 10. Step 144 may be carried out using the coating unit 80 to apply the primary curable composition, the secondary curable composition and/or the ink curable composition. As such, step 144 may include a substep of applying a curable ink composition over a curable composition (e.g., one or more of the primary curable composition and secondary curable composition) on the optical fiber 22. For example, in the wet-on-wet application, two or more of the primary curable composition, the secondary curable composition and/or the ink curable composition may be applied over one another for a later step of simultaneously curing the compositions using the curing component 84. The draw speed, or speed at which the optical fiber 22 is moving, may be about 35 m/s, or about 40 m/s, or about 45 m/s, or about 50 m/s, or about 55 m/s, or about 60 m/s, or about 65 m/s, or about 70 m/s, or about 75 m/s, or about 80 m/s, or about 85 m/s or any and all values and ranges between these values. For example, the draw speed of the optical fiber 22 may be from about, or from 30 m/s to about 100 m/s, or from about 40 m/s to about 80 m/s, or from about 60 m/s to about 80 m/s.

After step 144, a step 148 of passing the optical fiber 22 and the curable composition along the central axis 116 of the curing component 84, as described above, including the plurality of light sources 120 is performed. As the optical fiber 22 is coupled at both ends (i.e., by the preform 18 and the rollers 38) the optical fiber 22 may generally be positioned along the central axis 116 of the first tube 88 as it is drawn through the curing component 84. It will be understood that the optical fiber 22 may twist, wiggle, vibrate and/or translate along or around the central axis 116 as a result of its movement without departing from the teachings provided herein.

Simultaneously with step 148, a step 152 of emitting light 122 (e.g. ultraviolet light or light at short visible wavelengths) from the plurality of light sources 120 toward the central axis 116 of the curing component 84 is performed. As explained above, the plurality of light sources 120 is positioned around a perimeter of the curing component 84 such that light emitted from the plurality of light sources 120 converges on the central axis 116 to create a high-intensity spot. Within the spot, the light may have an intensity of from about 40 W/cm$^2$ to about 400 W/cm$^2$ or from about 100 W/cm$^2$ to about 400 W/cm$^2$ as measured at the central axis 116. It will be understood that as the optical fiber 22 including the primary curable composition, the secondary curable composition and/or the curable ink composition is passing through the central axis 116, the intensity of the light 122 impinging on, interacting with, or contacting the optical fiber 22 may be substantially the same as outlined above in connection with the central axis 116.

Simultaneously with steps 148 and 152, a step 156 of reflecting the light 122 off of the reflective coating 124 positioned on the interior surface 96 of the curing component 84 is performed. Light 122 from the plurality of light sources 120 and/or the second plurality of light sources 130, despite being aimed at the central axis 116, may pass by the optical fiber 22 due to the small diameter of the optical fiber 22. As such, the efficiency of the curing component 84 may be increased by incorporating the reflective coating 124 to redirect or reflect the light back toward the central axis 116 and the optical fiber 22. Further, redirection of the light 122 back toward the central axis 116 of the curing component 84 may increase the intensity of the light 122 at the central axis 116.

Simultaneously or after steps 148, 152 and 156, a step 160 of curing the curable composition into a coating using the light 122 is performed. In a first example, the curable composition may be the primary curable composition or the secondary curable composition which are cured into the primary coating 58 and the secondary coating 62, respectively. In wet-on-wet mode examples, the step 160 may include curing the curable ink composition and the curable composition with the light 122 simultaneously such that one or more of the primary coating 58 and the secondary coating 62 are simultaneously formed with the ink layer 66. In operation, as the optical fiber 22 is passing through, or traveling along, the central axis 116, the high-intensity spot of the light 122 impinges, interacts with or contacts the curable compositions present on the optical fiber 22 to form one or more of the primary coating 58, secondary coating 62 and/or ink layer 66. According to various examples, step 160 may be carried out such that one or more of the primary coating 58, secondary coating 62 and/or ink layer 66 does not reach full cure. In such an example, one or more of the primary coating 58, secondary coating 62 and/or ink layer 66 may reach a degree of cure which is less than fully cured. As used herein, the term "degree of cure" is a measure of the extent to which the curing reaction proceeds. Before initiation of the curing reaction using the light 122, the concentration of curing functional groups (e.g., acrylates) is high. As the curing reaction proceeds upon initiation, the concentration of functional groups decreases. A determination of the concentration of functional groups provides a measure of the extent of the curing reaction. In other words, the degree of cure is a measure of the change in the concentration of functional groups.

The degree of cure ("DOC") for acrylate containing compounds is measured using the Reacted Acrylate Unsaturation ("% RAU") method. In the % RAU method, the concentration of acrylate functional groups is assessed by Fourier-transform infrared spectroscopy ("FTIR"). Acrylate functional groups include a carbon-carbon double bond with a characteristic absorption frequency in the infrared centered near 810 cm$^{-1}$. The baseline for a measurement is taken as the tangent line through the absorption minima of the characteristic acrylate band. The area of the characteristic acrylate band is taken as the area of the band above the baseline. To account for background intensity and instrumental effects on the area measurement, the area of a reference band in the 750-780 cm$^{-1}$ region using the baseline of the characteristic acrylate band is measured. The spectral region of the reference band is outside of the absorption range of acrylate functional groups. The ratio of the area of the characteristic acrylate band to the area of the reference band is then determined. This ratio is proportional to the concentration of unreacted acrylate functional groups in the coating composition. As the curing reaction proceeds, the intensity of the characteristic acrylate band decreases and the magnitude of the decrease is a measure of the degree of cure at any point during the curing reaction. % RAU is defined by equation 1:

$$\% \, RAU = \frac{(R_L - R_F) * 100}{R_L} \quad (\text{Eq. 1})$$

wherein where $R_L$ is the ratio for the uncured portion of curable composition in question (e.g., the primary curable composition or secondary curable composition) and $R_F$ is the ratio for the cured product of the curable composition in question.

The curing step 160 may be carried out until at least one of the primary coating 58, secondary coating 62 and/or ink layer 66 is from about 80% cured to about 99% cured, or from about 80% cured to about 90% cured, or from about 90% to about 98% cured, or from about 95% cure to about 98% cured, or from about 85% cured to about 98% cured. For example, one or more of the primary coating 58, the secondary coating 62 and the ink layer 66 may be cured to about 80%, or about 81%, or about 82%, or about 83%, or about 84%, or about 85%, or about 86%, or about 87%, or about 88%, or about 89%, or about 90%, or about 91%, or about 92%, or about 93%, or about 94%, or about 95% or about 96% or about 98% or about 100% or any and all values and ranges between these values. In a specific example, the primary coating 58 is from about 85% to about 95% cured, the secondary coating 62 is from about 85% to about 100% cured, and the ink layer 66 is from about 91% to about 98% cured.

It will be understood that the method 140 may be repeated once a first coating (e.g., the primary coating 58) has been formed to provide a second coating (e.g., the secondary coating 62). Further, it will be understood that the steps of the method 140 may be performed in any order, with additional steps or omitting steps.

Use of the present disclosure may provide a greater intensity of light 122 which may reduce curing time and allow increased draw speeds (e.g., about 60 m/s or greater, about 80 m/s or greater, or about 100 m/s or greater).

Use of the present disclosure may also reduce the overall length of the curing component 84 as compared to conventional designs. Often in conventional designs, a single mercury lamp which produces ultraviolet light is positioned next to a moving waveguide. As a single mercury lamp is employed, either the length of the lamp needs to be increased (i.e., using a greater amount of space on a draw tower) or the draw speed of the waveguide needs to be slowed (i.e., resulting in a decrease in production) in order to ensure sufficient curing has taken place. By using a curing component as described herein, a greater intensity of the light 122 may be achieved at the central axis 116 which allows for a rapid and controllable cure of the curable compositions on the optical fiber 22. Further, the overall length of the curing component 84 may be shortened as the intensity of the light 122 has increased to cure the curable compositions in a shorter distance.

Third, as the plurality of light sources 120 may include light-emitting diodes, a greater control of the curing and energy efficiency may be obtained. Mercury lamp production of ultraviolet light often generates excess heat and provides little control over the output of the light across its length. Contrarily, examples of the plurality of light sources 120 which use arrays of light-emitting diodes allow both an increased efficiency in the production of light 122 as well as the ability to control the intensity of the light 122 along the length of the central axis 116. For example, the intensity of the light 122 may be adjusted across the length each of the plurality of light sources 120. Further, the peak wavelength of each of the plurality of light sources 120 may be changed across its length. For example, a wavelength which activates the photoinitiator of the primary curable composition may be emitted proximate a top of one or more of the plurality of light sources 120, a wavelength which activates the photoinitiator of the secondary curable composition may be emitted proximate a middle of one or more of the plurality of light sources 120, and a wavelength which activates the photoinitiator of the curable ink composition may be emitted proximate a bottom of one or more of the plurality of light sources 120.

Fourth, as the intensity of the light 122 emitted by the plurality of light sources 120 is greater than conventional designs, the curable ink composition may be applied over the primary curable composition and/or the secondary curable composition. In conventional designs, colored layers applied to waveguides generally have had to be applied after previous layers were fully cured as the colored component of the colored layer absorbs a significant portion of the curing light. Use of the presently disclosed curing component 84 and the plurality of light sources 120 create a sufficient intensity of light 122 on the optical fiber 22 that underlying layers such as the primary curable composition (when covered by the secondary curable composition and/or curable ink composition) receive sufficient light 122 through the curable ink composition to be cured to a predetermined level.

Table 1 shows an exemplary coating type, coating thickness, and curing lamp type and curing lamp length that may be used in accordance with some embodiments of the current disclosure.

TABLE 1

| Coating | Exemplary Primary coating as defined in paragraph [0078] U.S. 20210094873A1 |
|---|---|
| Length of LED Stacks (m) | Variable (0.508-1.52 m) |
| Primary Coating Thickness (microns) | 32.5 |
| Wavelength of LED (nm) | 395 |
| Molar Concentration of Photoinitiator (mol/L) | 0.043 |
| Molar Attenuation Coefficient of Photoinitiator (L/mol/cm) | 418 |

Table 2 shows the effect of silica glass articles (windows and/or tubes) placed between the LED light source and the optical fiber coating on the intensity of light at the surface of the coating. Uncoated glass and AR coating was modeled to have 3.08% and 0.77% reflective loss, respectively, per glass/air interface.

TABLE 2

| Number of Glass Samples Between Detector and LED | Intensity (W/cm$^2$) for no AR coating | Intensity (W/cm$^2$) with AR coating |
|---|---|---|
| 0 | 24.0 | 24.0 |
| 1 | 22.5 | 23.6 |
| 2 | 21.0 | 23.3 |
| 3 | 19.6 | 22.9 |
| 4 | 18.1 | 22.5 |

Tables 3-8 below show the Degree of Cure (DOC) for an exemplary primary coating at the end of the primary stack of LED lamps (395 nm) as a function of draw speed (40-100 m/s) and LED stack length (0.508-1.52 m). The exemplary primary coating has the following coating composition: 49.10 wt % Oligomeric Material, 45.66 wt % Sartomer SR504, 1.96 wt % V-CAP/RC, 1.47 wt % Photoinitiator TPO, 0.98 wt % 1035, 0.79 wt % Adhesion Promoter, and 0.03 wt % Tetrathiol. According to one example, the oligomeric material may include an H12MDI Mole Number (n) of 3.7, an HEA Mole Number of (m) of 3.4, a PPG4000 Mole Number (p) of 2.0 and a Di-adduct weight percentage of 3.7, as described in U.S. Patent Application Publication No. 2018/0127593 A1 which is hereby incorporated herein by reference. Sartomer SR504 is ethoxylated(4)nonylphenol acrylate (available from Sartomer). V-CAP/RC is N-vinyl-caprolactam (available from ISP Technologies). TPO is 2,4,6-trimethylbenzoyl)diphenyl phosphine oxide (available from BASF under the trade name Lucirin and functions as a photoinitiator). 1035 is thiodiethylene bis[3-(3,5-di-tert-butyl)-4-hydroxy-phenyl) propionate] (available from BASF under the trade name Irganox 1035) and functions as an antioxidant. The adhesion promoters may include 3-acryloxypropyl trimethoxysilane (available from Gelest) or 3-mercaptopropyl trimethoxysilane (available from Aldrich). Tetrathiol is a catalyst quencher.

TABLE 3A

| Draw Speed (m/s) | 40 | 40 | 40 | 40 |
|---|---|---|---|---|
| Stack Length (m) | 0.508 | 0.508 | 1.02 | 1.02 |
| Maximum Intensity (no glass window or tube between LED and fiber coating) (W/cm$^2$) | 24 | 24 | 24 | 24 |
| Number of Glass Samples Between LED and Target | DOC without AR coating | DOC with AR coating | DOC without AR coating | DOC with AR coating |
| 0 | 63.14 | 63.14 | 84.91 | 84.91 |
| 1 | 61.88 | 62.81 | 83.98 | 84.67 |
| 2 | 60.54 | 62.56 | 82.95 | 84.49 |
| 3 | 59.20 | 62.23 | 81.89 | 84.24 |
| 4 | 57.67 | 61.88 | 80.63 | 83.98 |

TABLE 3B

| Draw Speed (m/s) | 40 | 40 | 40 | 40 |
|---|---|---|---|---|
| Stack Length (m) | 1.27 | 1.27 | 1.52 | 1.52 |
| Maximum Intensity (no glass window or tube between LED and fiber coating) (W/cm$^2$) | 24 | 24 | 24 | 24 |
| Number of Glass Samples Between LED and Target | DOC without AR coating | DOC with AR coating | DOC without AR coating | DOC with AR coating |
| 0 | 89.72 | 89.72 | 92.82 | 92.82 |
| 1 | 88.29 | 89.53 | 92.24 | 92.67 |
| 2 | 88.17 | 89.39 | 91.59 | 92.56 |
| 3 | 87.31 | 89.19 | 90.91 | 92.41 |
| 4 | 86.28 | 88.99 | 90.08 | 92.24 |

TABLE 4A

| Draw Speed (m/s) | 50 | 50 | 50 | 50 |
|---|---|---|---|---|
| Stack Length (m) | 0.508 | 0.508 | 1.02 | 1.02 |
| Maximum Intensity (no glass window or tube between LED and fiber coating) (W/cm$^2$) | 24 | 24 | 24 | 24 |
| Number of Glass Samples Between LED and Target | DOC without AR coating | DOC with AR coating | DOC without AR coating | DOC with AR coating |
| 0 | 55.02 | 55.02 | 78.81 | 78.81 |
| 1 | 53.80 | 54.70 | 77.71 | 78.53 |
| 2 | 52.50 | 54.46 | 76.50 | 78.31 |
| 3 | 51.23 | 54.13 | 75.27 | 78.01 |
| 4 | 49.77 | 53.80 | 73.83 | 77.71 |

TABLE 4B

| Draw Speed (m/s) | 50 | 50 | 50 | 50 |
|---|---|---|---|---|
| Stack Length (m) | 1.27 | 1.27 | 1.52 | 1.52 |
| Maximum Intensity (no glass window or tube between LED and fiber coating) (W/cm$^2$) | 24 | 24 | 24 | 24 |
| Number of Glass Samples Between LED and Target | DOC without AR coating | DOC with AR coating | DOC without AR coating | DOC with AR coating |
| 0 | 84.91 | 84.91 | 88.90 | 88.90 |
| 1 | 83.98 | 84.67 | 88.13 | 88.71 |
| 2 | 82.95 | 84.49 | 87.27 | 88.55 |
| 3 | 81.89 | 84.24 | 86.38 | 88.35 |
| 4 | 80.63 | 83.98 | 85.30 | 88.13 |

TABLE 5A

| Draw Speed (m/s) | 60 | 60 | 60 | 60 |
|---|---|---|---|---|
| Stack Length (m) | 0.508 | 0.508 | 1.02 | 1.02 |
| Maximum Intensity (no glass window or tube between LED and fiber coating) (W/cm$^2$) | 24 | 24 | 24 | 24 |

TABLE 5A-continued

| Number of Glass Samples Between LED and Target | DOC without AR coating | DOC with AR coating | DOC without AR coating | DOC with AR coating |
|---|---|---|---|---|
| 0 | 48.67 | 48.67 | 73.03 | 73.03 |
| 1 | 47.52 | 48.37 | 71.82 | 72.72 |
| 2 | 46.30 | 48.14 | 70.52 | 72.48 |
| 3 | 45.11 | 47.83 | 69.20 | 72.15 |
| 4 | 43.75 | 47.52 | 67.68 | 71.82 |

TABLE 5B

| | | | | |
|---|---|---|---|---|
| Draw Speed (m/s) | 60 | 60 | 60 | 60 |
| Stack Length (m) | 1.27 | 1.27 | 1.52 | 1.52 |
| Maximum Intensity (no glass window or tube between LED and fiber coating) (W/cm$^2$) | 24 | 24 | 24 | 24 |
| Number of Glass Samples Between LED and Target | DOC without AR coating | DOC with AR coating | DOC without AR coating | DOC with AR coating |
| 0 | 79.95 | 79.95 | 84.91 | 84.91 |
| 1 | 78.87 | 79.67 | 83.98 | 84.67 |
| 2 | 77.69 | 79.46 | 82.95 | 84.49 |
| 3 | 76.48 | 79.17 | 81.89 | 84.24 |
| 4 | 75.06 | 78.87 | 80.63 | 83.98 |

TABLE 6A

| | | | | |
|---|---|---|---|---|
| Draw Speed (m/s) | 70 | 70 | 70 | 70 |
| Stack Length (m) | 0.508 | 0.508 | 1.02 | 1.02 |
| Maximum Intensity (no glass window or tube between LED and fiber coating) (W/cm$^2$) | 24 | 24 | 24 | 24 |
| Number of Glass Samples Between LED and Target | DOC without AR coating | DOC with AR coating | DOC without AR coating | DOC with AR coating |
| 0 | 43.62 | 43.62 | 67.81 | 67.81 |
| 1 | 42.54 | 43.34 | 66.56 | 67.49 |
| 2 | 41.40 | 43.13 | 65.22 | 67.24 |
| 3 | 40.29 | 42.84 | 63.88 | 66.90 |
| 4 | 39.03 | 42.54 | 62.33 | 66.56 |

TABLE 6B

| | | | | |
|---|---|---|---|---|
| Draw Speed (m/s) | 70 | 70 | 70 | 70 |
| Stack Length (m) | 1.27 | 1.27 | 1.52 | 1.52 |
| Maximum Intensity (no glass window or tube between LED and fiber coating) (W/cm$^2$) | 24 | 24 | 24 | 24 |
| Number of Glass Samples Between LED and Target | DOC without AR coating | DOC with AR coating | DOC without AR coating | DOC with AR coating |
| 0 | 75.27 | 75.27 | 80.75 | 80.75 |
| 1 | 74.09 | 74.96 | 79.69 | 80.48 |
| 2 | 72.81 | 74.73 | 78.53 | 80.27 |
| 3 | 71.53 | 74.41 | 77.35 | 79.98 |
| 4 | 70.02 | 74.09 | 75.95 | 79.69 |

TABLE 7A

| | | | | |
|---|---|---|---|---|
| Draw Speed (m/s) | 80 | 80 | 80 | 80 |
| Stack Length (m) | 0.508 | 0.508 | 1.02 | 1.02 |
| Maximum Intensity (no glass window or tube between LED and fiber coating) (W/cm$^2$) | 24 | 24 | 24 | 24 |

TABLE 7A-continued

| Number of Glass Samples Between LED and Target | DOC without AR coating | DOC with AR coating | DOC without AR coating | DOC with AR coating |
|---|---|---|---|---|
| 0 | 39.49 | 39.49 | 63.14 | 63.14 |
| 1 | 38.48 | 39.23 | 61.88 | 62.81 |
| 2 | 37.42 | 39.03 | 60.54 | 62.56 |
| 3 | 36.38 | 38.76 | 59.20 | 62.23 |
| 4 | 35.21 | 38.48 | 57.67 | 61.88 |

TABLE 7B

| | | | | |
|---|---|---|---|---|
| Draw Speed (m/s) | 80 | 80 | 80 | 80 |
| Stack Length (m) | 1.27 | 1.27 | 1.52 | 1.52 |
| Maximum Intensity (no glass window or tube between LED and fiber coating) (W/cm$^2$) | 24 | 24 | 24 | 24 |
| Number of Glass Samples Between LED and Target | DOC without AR coating | DOC with AR coating | DOC without AR coating | DOC with AR coating |
| 0 | 70.77 | 70.77 | 76.80 | 76.80 |
| 1 | 69.54 | 70.45 | 75.65 | 76.50 |
| 2 | 68.21 | 70.21 | 74.40 | 76.27 |
| 3 | 66.88 | 69.88 | 73.13 | 75.96 |
| 4 | 65.34 | 69.54 | 71.65 | 75.65 |

TABLE 8A

| | | | | |
|---|---|---|---|---|
| Draw Speed (m/s) | 100 | 100 | 100 | 100 |
| Stack Length (m) | 0.508 | 0.508 | 1.02 | 1.02 |
| Maximum Intensity (no glass window or tube between LED and fiber coating) (W/cm$^2$) | 24 | 24 | 24 | 24 |
| Number of Glass Samples Between LED and Target | DOC without AR coating | DOC with AR coating | DOC without AR coating | DOC with AR coating |
| 0 | 32.96 | 32.96 | 55.02 | 55.02 |
| 1 | 32.07 | 32.73 | 53.80 | 54.70 |
| 2 | 31.17 | 32.55 | 52.50 | 54.46 |
| 3 | 30.25 | 32.31 | 51.23 | 54.13 |
| 4 | 29.23 | 32.07 | 49.77 | 53.80 |

TABLE 8B

| | | | | |
|---|---|---|---|---|
| Draw Speed (m/s) | 100 | 100 | 100 | 100 |
| Stack Length (m) | 1.27 | 1.27 | 1.52 | 1.52 |
| Maximum Intensity (no glass window or tube between LED and fiber coating) (W/cm$^2$) | 24 | 24 | 24 | 24 |
| Number of Glass Samples Between LED and Target | DOC without AR coating | DOC with AR coating | DOC without AR coating | DOC with AR coating |
| 0 | 63.14 | 63.14 | 69.45 | 69.45 |
| 1 | 61.88 | 62.81 | 68.20 | 69.12 |
| 2 | 60.54 | 62.56 | 66.87 | 68.88 |
| 3 | 59.20 | 62.23 | 65.53 | 68.54 |
| 4 | 57.67 | 61.88 | 63.44 | 68.20 |

Figure 4:
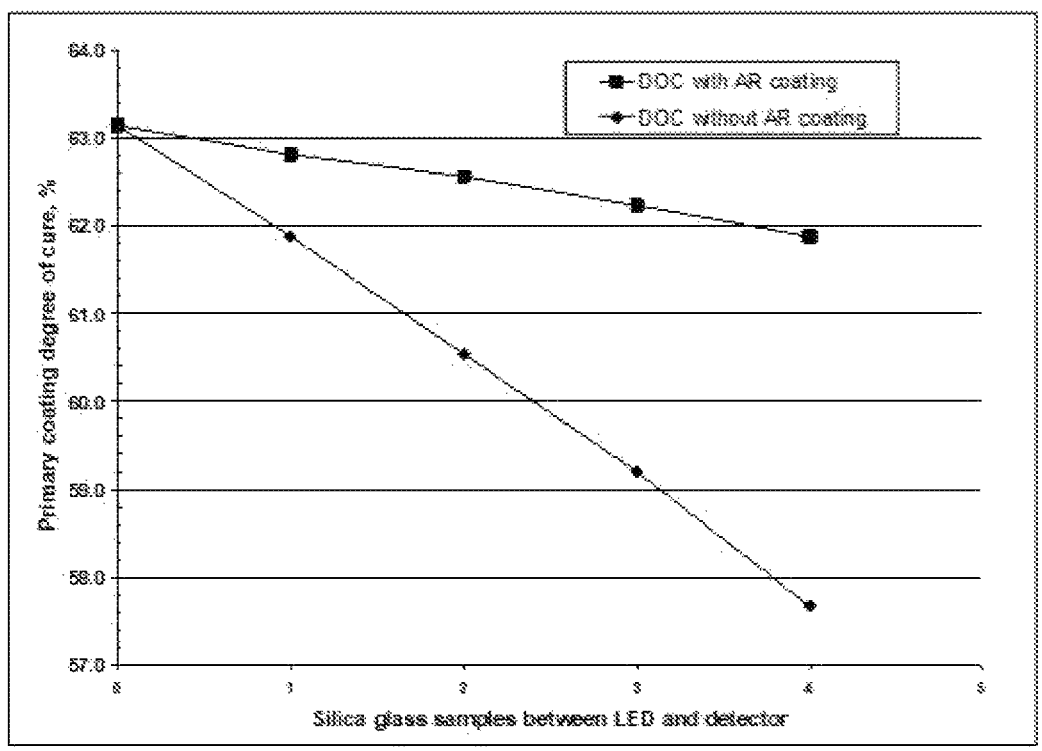
FIG. 4 is a graph showing the Degree of Cure (DOC) with and without AR coatings on silica glass articles between LED light sources and optical fiber coating, according to at least one example.
Figure 5:
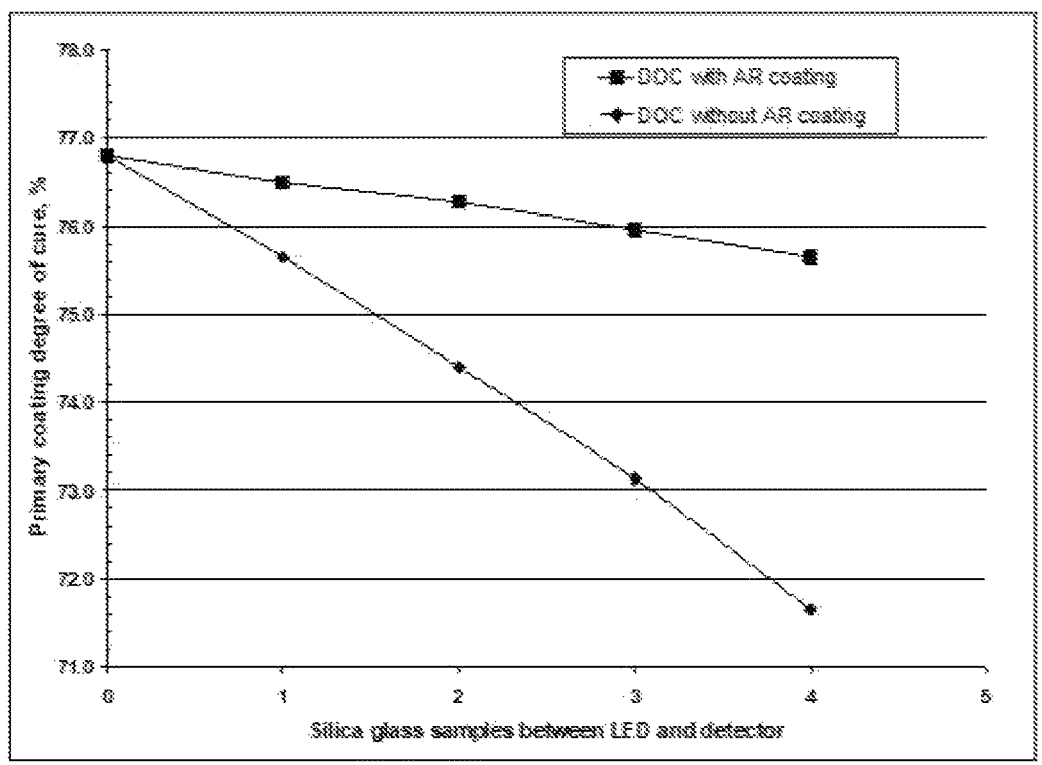
FIG. 5 is a graph showing the Degree of Cure (DOC) with and without AR coatings on silica glass articles between LED light sources and optical fiber coating, according to at least one example.

FIG. 4 shows the Degree of Cure (DOC) with and without AR coatings on silica windows (and/or tubes) between LED and coating, for the exemplary primary coating described in paragraph [0078] of US20210094873A1 drawn at 40 m/s at the end of the primary stack cured using 0.508 m of LED lamps (395 nm). These are the first two examples shown in Table 3A. FIG. 5 shows the Degree of Cure (DOC) with and without AR coatings on silica windows (and/or tubes) between LED and coating, for the exemplary primary coat- ing described in paragraph [0078] of US20210094873A1 drawn at 80 m/s at the end of the primary stack cured using 1.52 m of LED lamps (395 nm). These are the second two examples shown in Table 7B.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber curing component, comprising:
a first tube comprising a first body defining a first interior surface and a first exterior surface, the first tube defining a first aperture and a second aperture on opposite ends of a first cavity, wherein the first tube defines a central axis extending through the first cavity;
a plurality of light sources coupled to the first body of the first tube and configured to emit light having a wavelength range from about 250 nm to about 410 nm toward the central axis of the first tube, wherein each of the light sources intersect a common plane defined perpendicular to the central axis of the first tube;
a silica glass article having an anti-reflective coating, wherein the silica glass article is disposed between each of the plurality of light sources and the central axis of the first tube; and
a reflective coating positioned on the interior surface of the first body and configured to reflect the light toward the central axis of the first tube.

2. An optical fiber curing component, comprising:
a first tube comprising a first body defining a first interior surface and a first exterior surface, the first tube defining a first aperture and a second aperture on opposite ends of a first cavity, wherein the first tube defines a central axis extending through the first cavity;
a plurality of light sources coupled to the first body of the first tube; and
a silica glass article having an anti-reflective coating, wherein the silica glass article is disposed between at least one light source of the plurality of light sources and the central axis of the first tube, wherein the silica glass article comprises at least one of:
one or more windows disposed within the first body of the first tube, or
a second tube within the cavity.

3. The optical fiber curing component of claim 2, wherein the first body of the first tube defines the one or more windows, and wherein each of the plurality of light sources is configured to emit light toward the central axis of the first tube through each of a corresponding window.

4. The optical fiber curing component of claim 2, wherein the second tube comprises a second body defining an interior surface and an exterior surface, the second tube defining a first aperture and a second aperture on opposite ends of a second cavity, wherein the central axis extends through the second cavity.

5. The optical fiber curing component of claim 2, wherein each of the light sources of the plurality of light sources comprises an array of light emitting diodes.

6. The optical fiber curing component of claim 2, wherein the plurality of light sources is equally spaced around the first tube.

7. The optical fiber curing component of claim 2, wherein a distance between at least one of the plurality of light sources and the central axis is from about 1 cm to about 7 cm.

8. The optical fiber curing component of claim 2, wherein each of the plurality of light sources is substantially equally spaced from the central axis of the first tube.

9. The optical fiber curing component of claim 2, further comprising:
a second plurality of light sources positioned below the plurality of light sources, wherein the second plurality of light sources are positioned to emit light toward the central axis of the first tube.

10. The optical fiber curing component of claim 9, wherein each of the first and second plurality of light sources is configured to produce an intensity of light of from about 10 W/cm$^2$ to about 400 W/cm$^2$ as measured at the central axis of the first tube.

11. The optical fiber curing component of claim 2, wherein at least one of a length of the first tube or a length of the second tube is from about 100 cm to about 700 cm.

12. The optical fiber curing component of claim 2, wherein each of the plurality of light sources has a length in a direction parallel to the central axis and the light emitted by each of the plurality of light sources has a wavelength that varies along the length.

13. A method of coating an optical fiber, comprising:
applying a curable composition on a moving optical fiber;
passing the optical fiber and the curable composition along a central axis of a curing component comprising:
a first tube comprising a first body defining a first interior surface and a first exterior surface, the first tube defining a first aperture and a second aperture on opposite ends of a first cavity, wherein the first tube defines a central axis extending through the first cavity,
a plurality of light sources coupled to the first body of the first tube and configured to emit light having a wavelength range from about 250 nm to about 410 nm toward the central axis of the first tube, wherein each of the light sources intersect a common plane defined perpendicular to the central axis of the first tube,
a silica glass article having an anti-reflective coating, wherein the silica glass article is disposed between each of the plurality of light sources and the central axis of the first tube, and
a reflective coating positioned on the interior surface of the first body and configured to reflect the light toward the central axis of the first tube;
emitting light from the plurality of light sources toward the central axis of the curing component;
reflecting the light off of the reflective coating positioned on the interior surface of the curing component; and
curing the curable composition into a coating using the light.

14. The method of claim 13, wherein the silica glass article is one or more windows disposed within the first body of the first tube, a second tube within the cavity, or a combination thereof.

15. The method of claim 14, wherein the first body of the first tube defines the one or more windows, and wherein each of the plurality of light sources is configured to emit light toward the central axis of the first tube through each of a corresponding window.

16. The method of claim 14, wherein the second tube comprises a second body defining an interior surface and an exterior surface, the second tube defining a first aperture and a second aperture on opposite ends of a second cavity, wherein the central axis extends through the second cavity.

17. The method of claim 13, further comprising:
applying a curable ink composition over the curable composition on the optical fiber;
and
curing the curable ink composition and the curable composition with the light simultaneously.

18. The method of claim 13, wherein the optical fiber is moving at a speed of from about 30 m/s to about 100 m/s, and wherein the light comprises ultraviolet light and has an intensity of from about 48 W/cm$^2$ to about 384 W/cm$^2$ as measured at the central axis of the first tube.

19. The optical fiber curing component of claim 2, further comprising:
a reflective coating positioned on the interior surface of the first body and configured to reflect the light toward the central axis of the first tube.

20. The optical fiber curing component of claim 19, wherein the plurality of light sources is configured to emit light having a wavelength range from about 250 nm to about 410 nm toward the central axis of the first tube, and wherein each of the light sources intersects a common plane defined perpendicular to the central axis of the first tube.

* * * * *